Oct. 18, 1955 A. A. ZUHN ET AL 2,721,072
ENGINE GOVERNOR CONTROL FOR TORQUE CONVERTER OUTPUT SHAFT
Filed Feb. 24, 1953 2 Sheets-Sheet 1
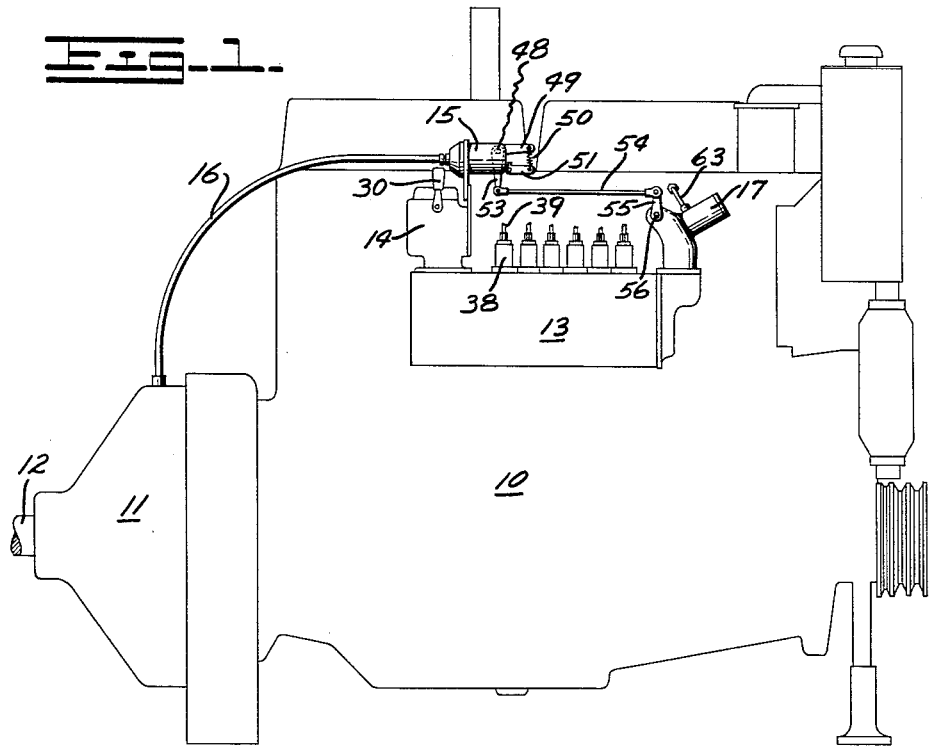
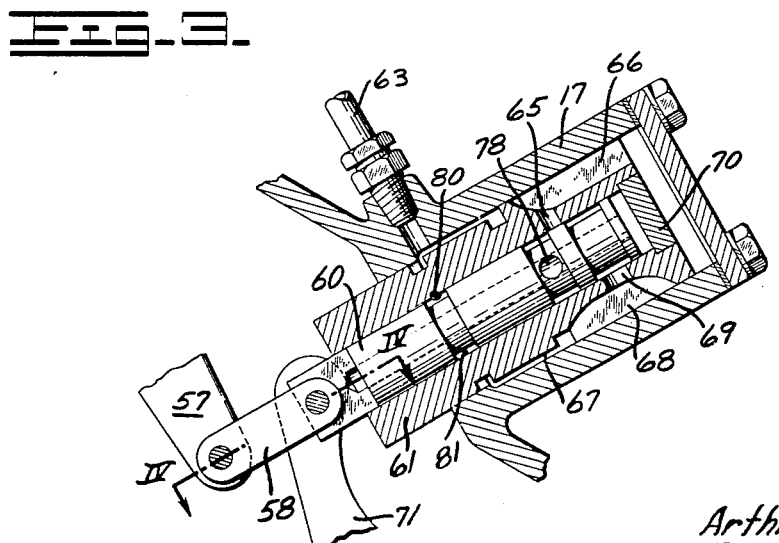
INVENTORS.
Arthur A. Zuhn
BY John H. Parks
Charles M. Fryer
ATTORNEY.

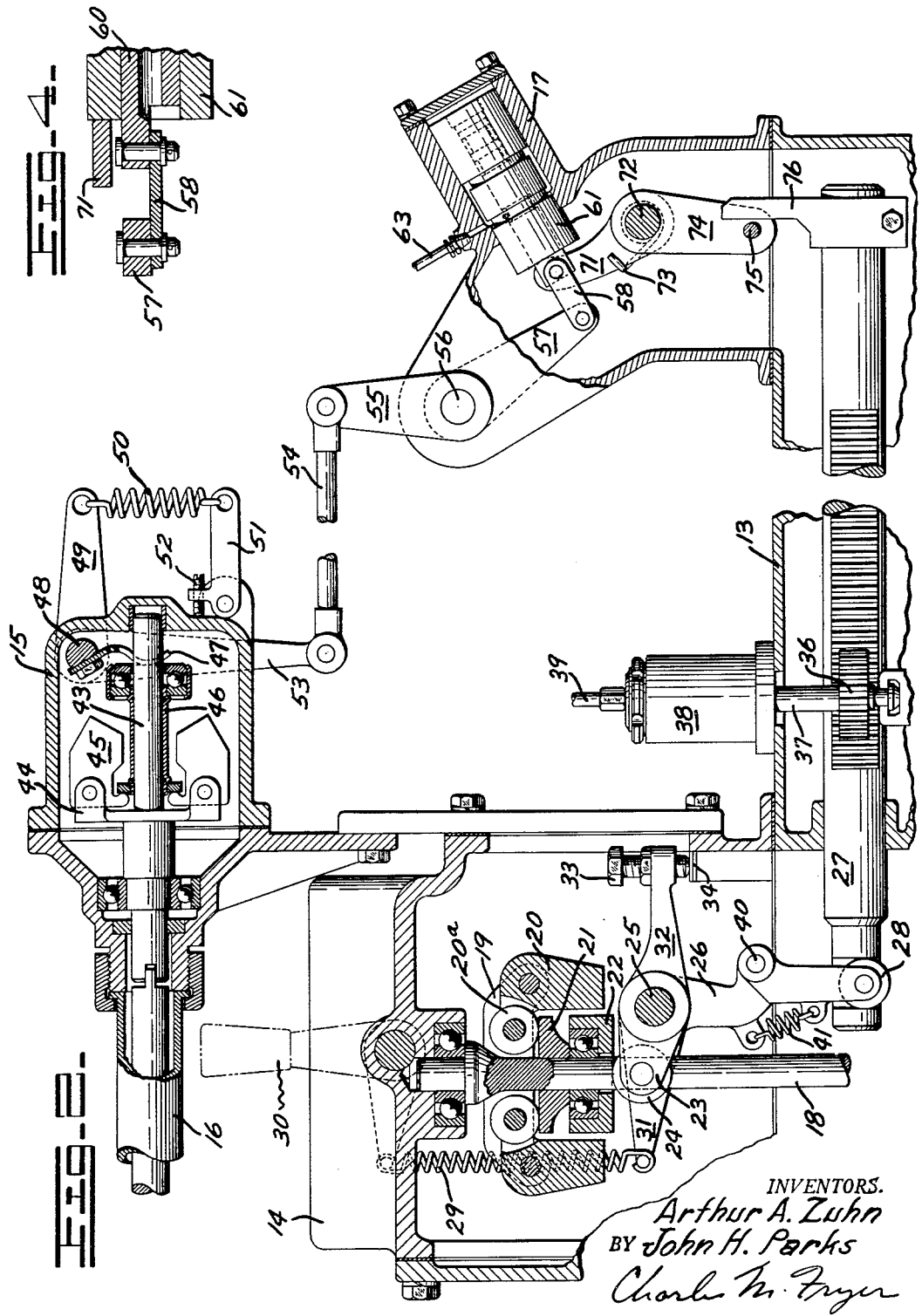

United States Patent Office 2,721,072
Patented Oct. 18, 1955

2,721,072

ENGINE GOVERNOR CONTROL FOR TORQUE CONVERTER OUTPUT SHAFT

Arthur A. Zuhn, East Peoria, and John H. Parks, Peoria, Ill., assignors to Caterpillar Tractor Co., Peoria, Ill., a corporation of California Application February 24, 1953, Serial No. 338,252

3 Claims. (Cl. 264—3)

This invention relates to governors and particularly to a device responsive to the speed of a torque converter output shaft to control the speed of an engine which drives the torque converter under certain conditions without interfering with the setting or operation of the main engine governor.

In many cases where an engine works through a torque converter as, for example, a fluid type converter, the load on the engine varies greatly from time to time and under no-load or light-load conditions, the output shaft and device or implement to which power is directed will operate at excessive speeds even though the engine is operated at a substantially constant speed under influence of its conventional governor.

A typical example of such condition is found in a power shovel, the normal function of which produces a cyclic variation in load conditions. During the dig, crowd, and hoist portions of the cycle the shovel engine is operating in a relatively high load range while on the following swing, dump and return portions of the cycle, the engine operates in the lower load range. As a result of the relatively light load on the engine, the torque converter output shaft tends to run at higher speeds. Often these speeds exceed a safe or desirable speed of operation of the shovel or other driven implement. It is desirable, therefore, to govern the engine or reduce its speed in response to excessive tail shaft speeds.

It is an object of the present invention to provide a simple and inexpensive device for use in combination with a standard engine governor to reduce the speed of the engine in the event of excessive speed of an engine driven torque converter output shaft without interfering with the normal operation of the standard engine governor.

The manner in which this object is accomplished, and further and more specific objects and advantages of the invention, are made apparent in the following specification wherein reference is made to the accompanying drawings.

In the drawings:

Fig. 1 is an outline view in side elevation of an engine and torque converter illustrating the relative positions thereon of the several elements employed in the practice of the present invention, Fig. 2 is a vertical sectional view through an engine governor and engine fuel control mechanism with parts broken away and also illustrating in section an auxiliary or tail shaft governor and a fluid motor actuated by the tail shaft governor for operating the engine fuel control mechanism, Fig. 3 is an enlarged central sectional view through the fluid motor shown in Fig. 2, and Fig. 4 is a sectional view of a part of the fluid motor taken on the line IV—IV of Fig. 3.

Referring first to Fig. 1 of the drawings, an engine 10 is shown with a conventional fluid torque converter at 11, a part of the output shaft of the torque converter being shown at 12. The construction of the torque converter is incidental to the present invention and is therefore not shown in detail. The motor 10 is shown as having a conventional fuel injection assembly 13 mounted on one side of its block and under the control of an engine governor 14. An output or tail shaft governor is shown at 15 as connected to the tail shaft through a flexible drive cable 16 through any suitable driving connection, such as gears not shown. The tail shaft governor controls the operation of a fluid motor illustrated at 17 in a manner presently to be described.

In Fig. 2 of the drawings, a portion of the conventional governor is illustrated as having a main governor shaft 18 driven through gears, not shown, during operation of the engine and rotating at a speed comparable to that of engine speed. A yoke 19 is formed as a part of the shaft 18 and carries pivoted flyweights 20 which tend to swing outwardly when the engine speed is increased. Rollers 20a on the flyweights bear downwardly against a collar 21 when the flyweights swing outwardly and this collar in turn bears on an anti-friction bearing 22 which transmits rocking motion to a lever 23 through a roller 24. The lever 23 is fixed on a shaft 25 to which is also fixed a lever 26 connected to a fuel control or rack bar 27 through a roller 28. A main governor spring shown at 29 extends between a hand lever assembly 30 and a lever 31 also fixed to the shaft 25. Another lever 32 on the shaft 25 carries an adjustable stop screw 33 engageable against a stop 34 for establishing a limit to governor controlled engine fuel usually referred to as a maximum load stop. The construction and operation of this type of governor is well known.

Upon the tendency of its flyweights to spread outwardly due to increased engine speed, the lever 26 moves the rack bar 27 toward the right, as illustrated in Fig. 2, to rotate gears 36 fixed to the plunger 37 on fuel pumps, one of which is indicated at 38. There is, of course, one such fuel pump for each combustion cylinder of the engine, though in the present illustration only one is shown. The fuel pump plungers are reciprocated through conventional mechanism to inject fuel in measured quantities to the combustion chambers through conduits, such as indicated at 39, and the plungers are so designed that the quantities of fuel metered may be adjusted by their partial rotation as is accomplished when the rack bar moves and rotates the gear 36.

The lever 26, through which the rack bar is reciprocated for controlling fuel supply to the engine, is made of two parts pivotally connected as by a pin 40 and held in a relatively straight or uncocked position by a spring 41 connected between its two parts. The spring is under sufficient tension to maintain the lever 26 in its straight position during normal governor operation but the tension may be overcome by sufficient pressure applied to the rack bar in opposition to the control of the governor.

The tail shaft governor 15 is also of more or less conventional construction and comprises a governor shaft 43 rotated through the flexible cable 16 at a speed corresponding to the speed of the tail shaft of the torque converter. The shaft 43 also carries a yoke 44 and flyweights 45, which upon excessive tail shaft speeds, will tend to separate and slide a bearing assembly 46 on the governor shaft until it rocks a lever 47 fixed to a shaft 48. The shaft 48 also carries a governor spring lever 49 so that a governor spring 50 secured thereto balances the tendency of the weights 45 to spread. The anchor for the spring 50 is shown as a lever 51 with an adjusting screw 52 for varying the tension of the spring. This tail shaft governor controls the operation of the fluid motor 17 and is connected thereto by a lever 53 also fixed to the shaft 48, a link 54 and a lever 55 on a shaft 56. The shaft 56 is connected by a lever 57 and link 58 to a valve spool, best shown at 60 in Fig. 3. The valve spool is slidable in an axial bore of a plunger 61 which is, in turn, slidable in the main cylinder of the fluid motor 17. Fluid under pressure is always directed to the cylinder of the fluid motor as by a conduit 63 in communication with a source of fluid under pressure such, for example, as the lubricating oil system of the engine.

In Fig. 3, the normal position of the fluid motor is shown as being a condition which would exist when the engine is operating under load and the tail shaft is not rotating at an excessive speed. Assuming that the load is suddenly decreased as occurs, for example, in shovel operation during the swing, dump and return portions of the cycle, the tail shaft tends to increase its speed, actuating the governor 15 to swing the lever 53 to the right, as shown in Fig. 2, and through the connections 54, 55 and 57 to pull the valve spool 60 outwardly a short distance. This movement of the valve spool 60 opens a port 65 communicating between the inner bore of the plunger 61 and a passage 66 formed in its outer surface. With this port opened, fluid under pressure entering through the conduit 63 passes through a reduced area 67 and through a passage 68 and port 69 through the port 65 and passage 66 to the head end of the plunger 61 where its center bore is closed as by a plug 70. This fluid pressure in the motor advances the plunger toward the left, as viewed in Figs. 2 and 3, causing it to bear against a lever 71 on a shaft 72 and through the medium of a spring 73 to rock a lever 74 toward the right. A pin 75 on the lever 74 engages a finger 76 which is clamped to the end of the rack bar so that the rack bar is moved toward the right to rotate the gears 36 of the injection pump plungers toward their shut-down position and thus to decrease the speed of the engine.

During the operation just described, the movement of the plunger 61 follows the movement of the valve spool 60 until the port 65 is again closed when it registers with the large part of the valve spool and again assumes the position shown in Fig. 3. This discontinues the flow of fluid under pressure to the head end of the plunger 61 so that the rack bar is not moved all of the way to its shut-down position. It is, of course, the lever 26 which enables this movement of the rack bar without disturbing the position of the main engine governor.

When the engine again encounters a load as when the shovel enters the next dig portion of the cycle, the speed of the tail shaft is reduced and the valve spool is urged back into the plunger until the port 65 is again uncovered. This permits the oil at the head end of the plunger to flow through the channel 66 through port 65 and then outwardly through a port 78 which communicates with the hollow interior of the spool 60 so that the oil can drain outwardly therefrom. When the plunger 61 is free to return into the cylinder, the spring 73 urges it into the cylinder toward its original position. The levers 71 and 74 with which the spring 73 is associated are both fixed against rotation on the shaft 72, though the shaft is itself free to oscillate. One end of the spring 73, as shown in Fig. 2, is bent over the edge of lever 71 and the opposite end of the spring, not shown, is anchored to the housing so that the tendency of the spring is to swing the levers 71 and 74 in a clockwise direction. As shown in Fig. 4, the lever 71 bears against the end of the plunger at all times under the influence of the spring 73. The spring is also of sufficient strength to prevent the plunger from being ejected from its cylinder by small pressure, such as may be imposed against the shoulder in the plunger where the passage 67 is formed. The spring also serves in urging the levers in a clockwise direction to space the pin 75 from the finger 76 under normal conditions of operation so that there is no interference with the movement of the rack bar through the main engine governor. The outward movement of the valve spool 60 in the bore of the plunger may be limited as by a pin 80 extending through the plunger and acting against the shoulders of a circumferential groove 81 in the valve spool. This pin 80 also acts in the event of oil pressure failure to move the rack toward shut off position by direct contact with the shoulder of the groove 81 when the spool 60 moves outwardly.

We claim:

1. In a dual governor for use with an engine driving an output shaft through a torque converter or the like and having a first engine driven governor to control fuel supply, means to prevent overspeeding of the output shaft under light load conditions which comprises a second governor driven by the output shaft, means connecting the second governor to the engine fuel supply means for actuation thereof independently of the engine governor, said means connecting the second governor to the fuel supply means including a fluid motor to actuate the fuel supply means, and valve means controlled by the second governor to direct fluid under pressure to the fluid motor.

2. In a dual governor for use with an engine driving an output shaft through a torque converter or the like and having a first engine driven governor to control fuel supply, means to prevent overspeeding of the output shaft under light load conditions which comprises a second governor driven by the output shaft, means connecting the second governor to the engine fuel supply means for actuation thereof independently of the engine governor, said means connecting the second governor to the fuel supply means including a fluid motor to actuate the fuel supply means, valve means controlled by the second governor to direct fluid under pressure to the fluid motor, and a resilient connection between the engine governor and the fuel supply means to permit control of the latter by the fluid motor without interfering with the normal operation of the engine governor.

3. In a dual governor for use with an engine driving an output shaft through a torque converter or the like and having a first engine driven governor to control fuel supply, means to prevent overspeeding of the output shaft under light load conditions which comprises a second governor driven by the output shaft, and means connecting the second governor to the engine fuel supply means for actuation thereof independently of the engine governor, said means connecting the second governor to the fuel supply means including a fluid motor with a hydraulically actuated plunger connected with the fuel supply means, said plunger having an axial bore with connecting passages in communication with a source of fluid pressure and a reciprocable valve element therein, and connections between said valve element and said second governor to control the supply of actuating fluid to said plunger.

References Cited in the file of this patent

UNITED STATES PATENTS

| 2,260,576 | Maybach | Oct. 28, 1941 |
| 2,602,655 | Gesner | July 8, 1952 |
| 2,628,470 | Orton | Feb. 17, 1953 |
| 2,645,474 | Barnes | July 14, 1953 |